(12) United States Patent
Chowdhury et al.

(10) Patent No.: US 9,317,641 B2
(45) Date of Patent: Apr. 19, 2016

(54) GATE SUBSTITUTION BASED SYSTEM AND METHOD FOR INTEGRATED CIRCUIT POWER AND TIMING OPTIMIZATION

(75) Inventors: Salim U. Chowdhury, Austin, TX (US); Georgios Konstadinidis, San Jose, CA (US)

(73) Assignee: Oracle International Corporation, Redwood City, CA (US)

( * ) Notice: Subject to any disclaimer, the term of this patent is extended or adjusted under 35 U.S.C. 154(b) by 1015 days.

(21) Appl. No.: 12/880,275

(22) Filed: Sep. 13, 2010

(65) Prior Publication Data

US 2012/0066658 A1 Mar. 15, 2012

(51) Int. Cl.
*G06F 17/50* (2006.01)

(52) U.S. Cl.
CPC .......... *G06F 17/505* (2013.01); *G06F 2217/78* (2013.01); *G06F 2217/84* (2013.01)

(58) Field of Classification Search
None
See application file for complete search history.

(56) References Cited

U.S. PATENT DOCUMENTS

| | | | |
|---|---|---|---|
| 6,745,371 B2 * | 6/2004 | Konstadinidis et al. | 716/113 |
| 7,448,009 B2 * | 11/2008 | Pundoor | 716/133 |
| 7,653,885 B2 * | 1/2010 | Nandy et al. | 716/133 |
| 7,930,674 B2 * | 4/2011 | Parker et al. | 716/134 |
| 2003/0188268 A1 | 10/2003 | Konstadinidis et al. | |
| 2010/0153897 A1 * | 6/2010 | Zahn | 716/9 |

OTHER PUBLICATIONS

Gupta, Puneet et al., A Practical Transistor-Level Dual Threshold Voltage Assignment Methodology, Proceedings of the Sixth International Symposium on Quality Electronic Design, 2005, pp. 1-6.
Hung, W. et al., Total Power Optimization Through Simultaneously Multiple-V[DD(subscript)] Multiple-V[TH (subscript)] Assignment and Device Sizing With Stack Forcing, Proceedings of the 2004 International Symposium on Low Power Electronics and Design, pp. 144-149.
Karnik, Tanay et al., Total Power Optimization by Simultaneous Dual-Vt Allocation and Device Sizing in High Performance Microprocessors, 1975, pp. 486-491.
Ketkar Mahesh et al., Standby Power Optimization Via Transistor Sizing and Dual Threshold Voltage Assignment, IEEE, 2002, pp. 375-378.
Lackey, David E. et al., Managing Power and Performance for System-on-Chip Designs Using Voltage Islands, IEEE, 2002, pp. 195-202.
Lee, Wan-Ping et al., Voltage Island Aware Floorplanning for Power and Timing Optimization, ICCAD, Nov. 5-9, 2006, pp. 389-394, San Jose, CA.

(Continued)

*Primary Examiner* — A. M. Thompson
(74) *Attorney, Agent, or Firm* — Brooks Kushman P.C.

(57) ABSTRACT

A processing device can identify gates of an integrated circuit design having a slack value less than a predefined slack threshold. The processing device can further, for each of the identified gates, determine (i) a number of nodes of the integrated circuit design that experience a timing slack improvement if the gate is swapped with an alternative implementation having a reduced delay or (ii) a sum of timing slack improvements experienced by nodes of the integrated circuit design if the gate is swapped with the alternative implementation having a reduced delay. The processing device can still further swap the gate with the alternative implementation having the reduced delay if the determined number or sum is greater than a corresponding predetermined threshold.

20 Claims, 4 Drawing Sheets

(56) References Cited

OTHER PUBLICATIONS

Lee, Wan-Ping et al., Sensitivity-Based Multiple-Vt Cell Swapping for Leakage Power Reduction, IEEE 2008, pp. 1-4.
Lu, Liang-Ying et al, High Performance and Low Leakage Design Using Cell Replacement and Hybrid Vt Standard Cell Libraries, Proceedings of the International Multiconference of Engineers and Computer Scientists, Mar. 19-21, 2008, vol. 1, pp. 1-5, Hong Kong.
Edwards, Stephen et al., Tutorial 1, LINUX for EDA and Tutorial 2, Leakage Issues in IC Design: Trends, Estimation and Avoidance, date printed Jul. 20, 2010, pp. 1-2.
Shah, Saumil et al., Discrete Vt Assignment and Gate Sizing Using a Self-Snapping Continuous Formulation, IEEE, 2005, pp. 704-711.

* cited by examiner

GATE SUBSTITUTION BASED SYSTEM AND METHOD FOR INTEGRATED CIRCUIT POWER AND TIMING OPTIMIZATION

BACKGROUND

As CMOS technology advances, leakage power reduction is becoming more desirable. There are distinct challenges in reducing leakage power: improving the timing in timing critical parts of the design with the least increase in leakage power; and, reducing the leakage power in timing non-critical parts of the design without creating new timing violations.

SUMMARY

A method of selecting gates for an integrated circuit design may include identifying gates of the integrated circuit design having a slack value less than a predefined slack threshold. The method may also include, for each of the identified gates, determining a benefit count or benefit amount based on slack improvements associated with swapping the gate with an alternative implementation having a reduced delay, and swapping the gate with the alternative implementation having the reduced delay if the benefit count or benefit amount is greater than a corresponding predetermined benefit threshold.

DETAILED DESCRIPTION

Figure 1:
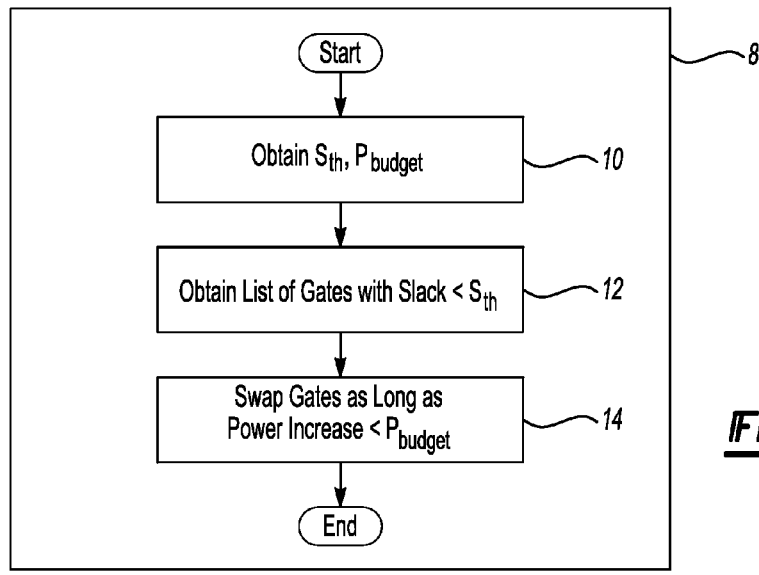
FIG. 1 is a flow chart illustrating an algorithm for vt swapping.

Various techniques exist for multi-vt gate swapping. These techniques can usually be classified into one of three categories: mathematical programming using analytical models, dynamic programming, and sensitivity-based methods.

Mathematical programming techniques may present several issues:

(i) They need analytical models for power, delay, slew, etc., which tend to be inaccurate and thus less reliable. More accurate models can be used in these techniques but cause extensive run time and mathematical ill-conditioning, leading to premature termination and the inability to converge at or find an optimal solution.

(ii) They offer continuous (in size or vt-variation) formulations, requiring mapping (snapping) of continuous sizes (or vt) to discrete available library gates.

(iii) They tend to have high run times and thus are not suitable for large designs, such as complex microprocessors with millions of gates (where these techniques are needed most).

Dynamic programming may present several issues:

(i) They are computationally intractable for high fan-out situations, which are very common in large circuits such as microprocessors.

(ii) They tend to require extensive memory.

Certain sensitivity-based methods may present issues:

(i) They lack a global view. Thus, solution quality may be low.

(ii) They may require an extensive amount of memory and run time when all (or nearly all) critical timing paths are considered via an instance requiring a timing report containing an extensive number of timing paths. Moreover, swapping an instance may render the timing report for all paths associated with such an instance as invalid.

Embodiments provided herein may prioritize gates according to various parameters to consider the local and global impact of swapping gates. (They need not, however, depend on enumerating timing paths—thus avoiding associated run time and memory complexity.) An indirect measure called benefit count may be used to obtain the number of end-points or flops (or in some embodiments, internal nodes on timing paths) at which timing paths terminate. To reduce run-time, this benefit count (or amount) may be evaluated at intermediate nodes to avoid tracing to end points. An incremental slack propagation technique may also be used to ascertain the impact of a swap on other instances—thus avoiding making decisions based on an initial snap shot of a timing report.

Embodiments provided herein may also minimize leakage power while meeting specified timing requirements. This may be accomplished, in certain circumstances, by not swapping gates in side paths (even if they are timing critical) to avoid swaps that would cause higher power without improving any timing slacks. Uncertainty in timing slack due to possible process and other variations may also be accounted for. Uncertainty may exist due to variations in rise and fall times at a node. The initial timing (and slack numbers) may be due to the rise time at a node, while post-optimization, the critical timing path may be due to the fall time at the same node. Extra swaps to higher leakage gates that would result in unnecessary over optimization of timing slacks in near critical timing paths may also be avoided. These techniques may use accurate gate and interconnect delay/slew computations and incremental slack propagation in the global circuit.

INTRODUCTION

Many blocks in an integrated circuit, such as a microprocessor, are composed of standard gates. For the same type of logic function (for example, a 2-input NAND gate), there are usually multiple standard gates having different size, power consumption (dynamic and leakage), and delay values. Once an integrated circuit is designed using a specific size for each individual logic gate, a timing and power analysis are usually performed. The timing analysis divides the circuit in two parts: the logic gates that are on timing paths meeting a certain cycle time requirement (called non-critical region) and the logic gates that are on timing paths not meeting the cycle time requirement (called critical region). The timing-critical paths have negative timing slacks and the non-critical paths have positive timing slacks. The objective of swapping gates in the non-critical region would be to save power (even though it might reduce the timing slacks). The objective of swapping gates in the critical region would be to improve timing (even though it might increase power).

In the timing non-critical region, gates are usually swapped with lower-power alternatives. The lower power alternatives may use lower area gates of the same standard threshold voltage (svt), higher threshold voltage (hvt) gates, or some other alternative such as gates having a number of longer channel length transistors. Some choices may provide the same footprint gates requiring no subsequent placement or routing. Other choices might require subsequent placement and or routing (not dealt with here). The lower power alternatives usually have more gate delays from the input(s) of the gate to the output(s). Thus, gate swapping usually will result in an increase in timing path delays-reducing the available positive slack. Care should be taken such that the timing slacks do not become negative.

Consider, for example, ten gates in a path with five units of positive slack. Assume that swapping each of the ten gates increases the delay by one unit. Thus, we can swap only five gates to keep the slack from becoming negative. Now consider that power-wise there are five gates, each of which provides a power savings of one unit if swapped. Also consider that each of the other five gates provides a power savings of two units if swapped. To maximize the reduction in power, we should select the gates with more power savings to swap. Furthermore, the number of timing paths affected by a gate should be considered. A gate controlling a fewer number of paths should be selected. This will allow an increase in the number of gate swaps and thus, will result in maximizing the power reduction.

A first challenge is to combine the (a) local power/delay sensitivities of gate swapping and (b) the global impact on timing paths into a single technique. In the timing critical region, gates are usually swapped with lower delay alternatives. The lower delay alternatives may use higher area gates of the same threshold voltage or lower threshold voltage gates, etc. The objective of gate swapping in this region should be to increase timing slacks (from negative to less negative) for as many timing paths as possible. Also, gate swapping within a timing path should consider minimizing the increase in power.

The objectives in the timing non-critical region and the timing critical region are distinct. While we attempt to impact the fewest timing paths in the timing non-critical region during a swap, we attempt to impact the most timing paths in the timing critical region. These conflicting objectives, however, may be resolved by first performing an aggressive swap of gates in the non-critical region. Thus, more gates are initially swapped than necessary to lower leakage gates (in fact, all gates can be swapped to lower leakage gates). As a result, some of the timing critical paths may become worse. The new objective is to restore the loss of timing slacks by re-swapping some of the gates back to lower leakage gates. A swap for an individual gate should thus impact as many timing paths as possible, which is one of the original objectives for the timing critical region. This new objective may be achieved, as explained below, by defining local delay/power sensitivities for appropriately selected gates, combining local sensitivities with the global impact on timing paths, and incrementally and efficiently updating the global timing slack scenario.

Formulation

We are given a set, G, of gates in a design. For each gate g∈G, we are given multiple alternatives providing a trade-off between delay and power. Our objective is to use the right alternative for each gate g∈G to reduce cycle time violations with the least increase in power. The reduction in cycle time violations can be measured in various ways: (a) sum of slack violations at every node where a timing violation exists; (b) sum of slack violations at nodes where one or more timing paths stop (or start); and (c) reduction in the highest cycle time violation. A combination of the above is also possible.

We distinguish between a purely combinational gate (which lies on one or more timing paths, but none of the paths either originate or end at the gate) and a sequential gate from which one or more timing paths originate and one or more timing paths end. We also understand that timing paths can start at an input port and end at an output port.

Solution Techniques

As outlined above, the first step is to convert all gates (except certain skip gates that should not be swapped at the user's discretion) to their lowest power alternatives. Subsequent steps swap as few gates back to their original power (or higher power) as possible to reduce increases in timing violations in the timing critical paths.

Step one is trivial and will not be discussed further. The lowest power alternative, however, has the highest delay. As a result, timing will degrade in the design. A new timing is performed to determine the timing slacks at each gate. The gates in the timing non-critical region can be left at the lowest power alternative. The gates in the timing critical region may need to be swapped to a lower-delay alternative. To accommodate for process and other variations, we select a slack value, $S_{th\text{-}highest}$, (below which a swap should be made) having a slightly positive number. The value of $S_{th\text{-}highest}$ can be ascertained from knowledge of expected variations and need not be discussed here.

The lowest delay alternative usually has the highest power. Thus to avoid increasing power too much, we fix a slack value, $S_{th\text{-}lowest}$ below which gates are swapped to lowest delay gates to be lower than zero. Gates, therefore, lying only in the most critical slack band are swapped to the lowest delay alternative. The most critical slack band can be determined by an allowable additional power budget. Thus, swaps to the lowest delay gates are made as long as the increase in power is limited to the additional power budget allowed by the user. The goal is to improve the timing within this limited power budget.

A generic step to swap gates to higher power alternatives is outlined below. This step is repeated m−1 times where m is the number of power alternatives available in the library. The parameters, $S_{th}$, can be changed (they usually should decrease) as we move to lower delay alternatives. The parameter, $P_{budget}$, needs to be set by the user. For swapping to standard vt and lower power gates, $P_{budget}$ can be unlimited.

For three power alternatives p1<p2<p3, we can initially swap all gates to type p1, then swap selectively from type p1 to type p2, and next swap selectively from type p1 or type p2 to type p3. For more than three power alternatives, various scenarios can be defined. For example, for alternatives p1>p2>p3>p4, one scenario could be: swap all swappable gates to type p1, swap selectively from type p1 to type p2, (blanket) swap all type p3 to type p2, next swap selectively from type p2 to type p3 (type p1 may or may not be skipped), finally, swap selectively from type p3 to type p4. Many such scenarios are envisioned.

FIG. 1 illustrates an algorithm for vt swapping as performed by processing device 8. The parameters $S_{th}$ and $P_{budget}$ are obtained at operation 10. At operation 12, a list of gates with slack less than $S_{th}$ is obtained. At operation 14, gates are swapped as long as the power increase is less than $P_{budget}$. As outlined above, we can swap from all lower power alternatives to the specific higher power alternative or skip some power alternative in this step.

Figure 2:
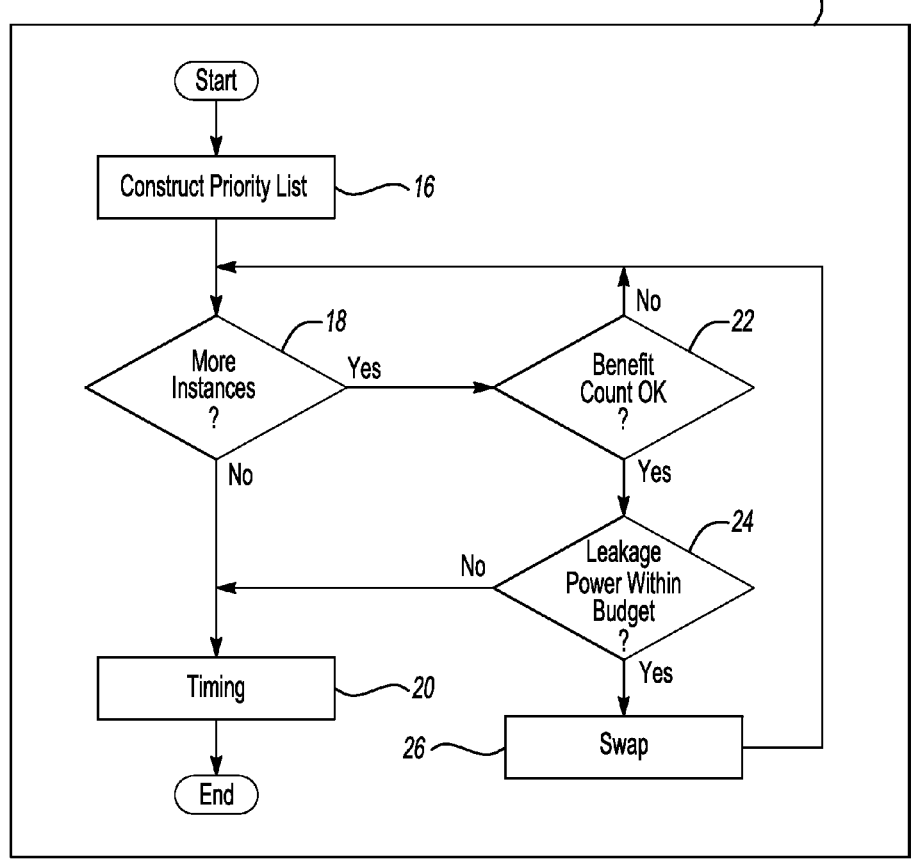
FIG. 2 is a flow chart illustrating an algorithm for swapping instances to improve timing with the least increase in power.

FIG. 2 illustrates an algorithm for swapping instances to improve timing with the least increase in power. The timing and power parameters that are local to a gate are used in building a priority list. This list contains all the gates that have a slack worse than the slack threshold.

We take gates one by one from the priority list (discussed below). The knowledge that helps to avoid over-optimization is contained in what is called benefit count (or amount). If swapping a gate improves five end points, then the benefit count is five. The benefit count embodies the global impact for the gate. The method of computing benefit count is discussed below.

If there is no benefit in swapping a gate, then we consider the next gate from the priority list. A power budget can be used to limit the swaps within the allowed limit of this power budget. One way to restrict the swap within the most critical timing paths is to provide a restrictive power budget.

Gates are swapped as long as the power budget is not exhausted. As soon as the power budget is exhausted, gate swapping is stopped.

The gates in the priority list are sorted in descending order of some weight called a priority value. The priority value may contain the following items:
(a) the slack violation value;
(b) the amount of reduction in delay if swapped;
(c) the amount of power increase if swapped; and,
(d) the benefit count or the benefit amount.

The benefit amount can be obtained by summing all the benefit amounts for individual end nodes (or intermediate nodes in some embodiments) which are benefited due to the swap.

(a) to (d) can be combined in a single priority value by combining them intelligently. For example, (a) and (b) provide the reduced violation amount. (a) and (b) also can be ignored in lieu of (d) (the benefit amount). For two instances providing the same benefit amount, we can break the tie by considering (c), the power increase. (d) can also be used as a constraint. In this scenario, we sort items using (a) through (d) and break the tie using (c). Once the priority list is constructed using (a), (b) and (c), we attempt to swap gates one by one from the priority list. Gates are swapped only if the benefit count (or amount) is more than zero in this scheme.

The amount of delay reduction ((b), also called delta_delay) can be the same as the delay improvement in the gate. In this case, the delay improvement will be the same for all fan-out nodes of a gate. The delay improvement in the interconnect may also be considered for additional run-time complexity. The delay improvement in the interconnect will usually be different for different fan-outs.

An example priority metric may be: slack*slack*delta_delay/delta_power. Similarly, many other priority metrics can be defined. Gate power can be replaced by gate area or gate width (if gate heights are the same). Also, power may be estimated using empirical formulae considering the widths of pMOS devices and the width of nMOS devices in a gate, etc. Delta_delay can be replaced by the delay of the gate, etc.

Benefit count (or amount) is dynamic. Swapping a gate changes the slack picture for the timing paths in the fan-in and fan-out cones of the gate. As a result, benefit count (or amount) changes for the impacted gates in the fan-in and fan-out cone. Due to the dynamic nature of the benefit count (or amount), it may not be advisable to include it in the priority metric. An iterative scheme, however, can be devised to make use of the power budget efficiently. In this iterative scheme, we define a benefit threshold (bth). Gates are swapped only if the benefit of swapping the gate is more than the bth. Once we cannot swap any more gates, we start a new iteration using a reduced bth. Iterations may continue until the power budget is exhausted or there are no more gates in the priority list for swapping.

At operation 16, a priority list is constructed. At operation 18, it is determined whether there are more instances in the priority list. If no, a timing is performed for the design in preparation for a sub-sequent swap, if any, or to ascertain the final timing for the design at operation 20. The algorithm then ends. If yes, it is determined whether the benefit count for the selected instance is more than the bth value at operation 22. If no, the instance is not swapped and the algorithm returns to operation 18. If yes, it is determined whether the leakage power is within budget at operation 24. If yes, the gate is swapped at operation 26. If no, the leakage budget is exhausted indicating that no more swaps can be performed and the algorithm proceeds to operation 20.

Figure 3:
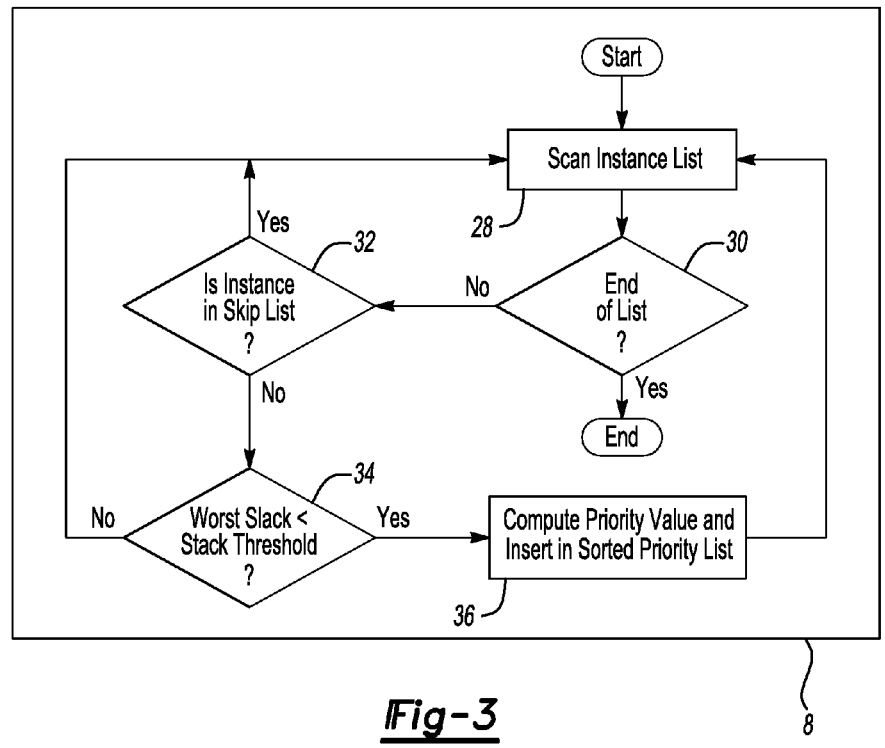
FIG. 3 is a flow chart illustrating an algorithm for obtaining a priority list.

We can obtain the priority list using an algorithm of the type illustrated in FIG. 3. We take gates in the design one by one until there are no more gates. For each gate, if it is not in a skip list provided by the user, we check if it is in the appropriate critical region of the design. If so, we compute a priority value and insert it in the sorted priority list.

At operation 28, the instance list of all instances is scanned to select a next instance. At operation 30, it is determined whether the end of the list has been reached. If yes, the algorithm ends. If no, it is determined whether the selected instance is in a skip list (e.g., a list of instances that should not be swapped) at operation 32. If yes, the algorithm returns to operation 28. If no, it is determined whether the worst slack for the instance is less than the slack threshold at operation 34. If no, the operation returns to operation 28. If yes, the priority value of the selected instance, at operation 36, is computed and is inserted into the priority list discussed with reference to operation 16 of FIG. 2. The algorithm then returns to operation 28.

Incremental Timing to Obtain Benefit Count/Amount

An incremental timing scheme may be used to obtain the benefit count/amount for a gate. An initial timing via a static timer provides arrival time and worst slack at every node. These values are then modified as gates are swapped and may be stored in a local data structure called NodeStorage.

Figure 4A:
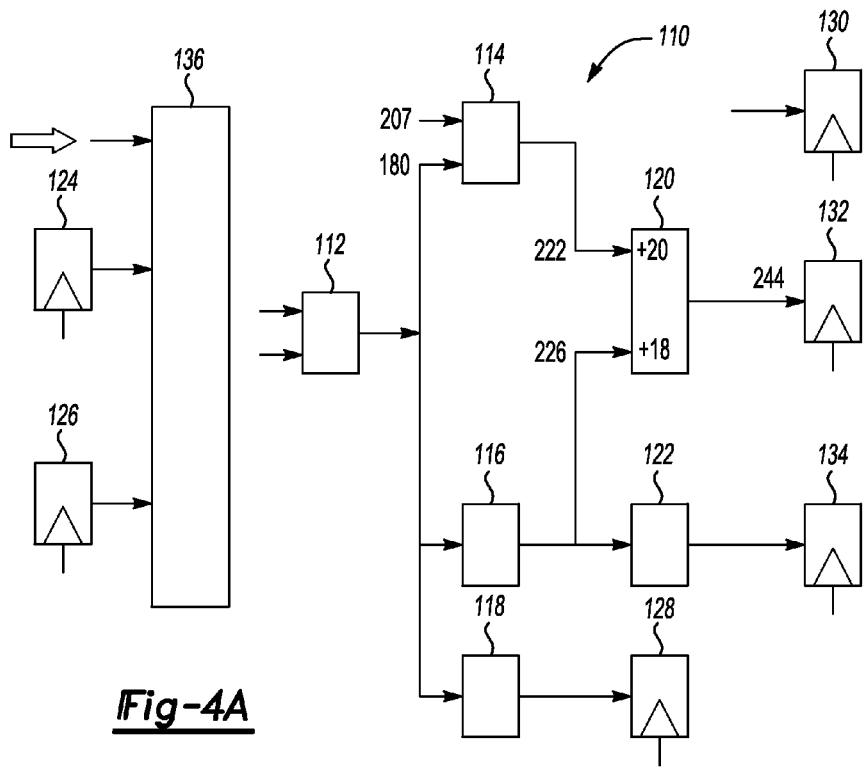
FIGS. 4A and 4B are block diagrams of a portion of an integrated circuit.

FIGS. 4A (before swap) and 4B (after swap) illustrate how a benefit count may be obtained. This benefit count indicates whether a swap will result in any timing improvement in timing paths/sub-paths. A portion of an integrated circuit 110 includes gates 112-122, latches 124-134 and a collection of logic gates 136. Arrival times (e.g., 207, 180, 222, etc.) are listed for some of the gates and latches. Assume that the gate 112 is the next gate selected from the priority list (discussed above) as a candidate for swap. Also assume that the delay reduction (if swapped) is 5 units. We propagate this delay reduction amount through the fan-out nodes 114, 116, 118, 120, 122 until we reach the end nodes 128, 132, 134 in the timing graph.

The entire delay reduction (5 units), in certain circumstances, can be propagated all the way to one or more end nodes (e.g., the nodes 128, 134), thus providing some non-zero benefit count and benefit amount.

Figure 4B:
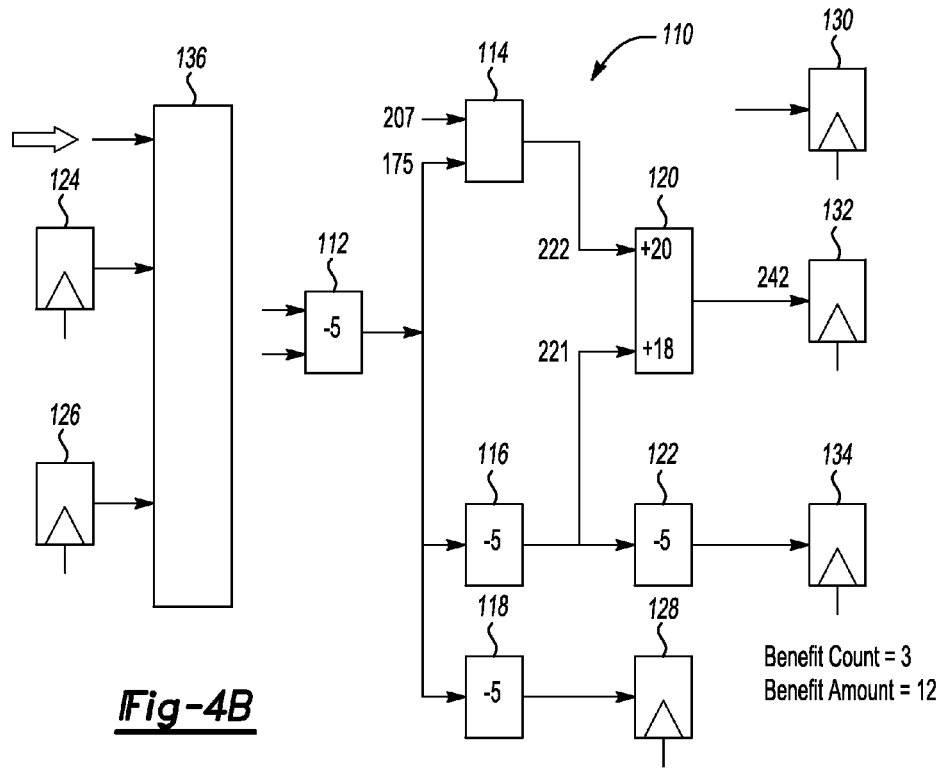

In other circumstances, only a fraction of the entire delay reduction amount can be propagated. The 2-input gate 120 provides an example. In this case, the delay reduction at the end node 132 is only two (not five) units. (In FIG. 4A, the arrival time of 226 governs the gate 120 as it is the latest. 226 plus the delay of 18 corresponding to that input results in the arrival time of 244. In FIG. 4B, the arrival time of 222 governs the gate 120 as it is now the latest. 222 plus the delay of 20 corresponding to that input results in the arrival time of 242.) We thus obtain a total benefit count of three and a total benefit amount of twelve units for the gate 112, if swapped. Propagation is stopped if delay reduction at a node is less than a certain small fraction.

In still other circumstances, none of the delay reduction amount can be propagated. The gate 114 provides an example. (The arrival time of 207 governs the gate as it is the latest.) In addition, we stop propagation of delay reduction in the timing paths where slack is more than the $S_{th}$ value because reducing slack in those paths is not a desired target, and thus, should not be considered in the benefit count (or amount).

When we swap the gate 112 to the appropriate lower power gate, we update the arrival times at all impacted nodes. We also compute the updated slack at each impacted node. The updated slack is simply the old slack at the node minus the benefit amount at the node. (Note that the updating of arrival time and slack does not occur during the propagation of the delay reduction in the process of obtaining benefit count/ amount.) We store them in a temporary map. Once the decision to swap is made, we obtain the data from the temporary map to update the NodeStorage. The NodeStorage data structure can be populated initially using the values obtained from the static timer.

Multiple Swap Iterations with Gradual Reduction in Benefit Count

One can have multiple iterations during swapping from one library to a lower delay library. In the first iteration, we can restrict the benefit count to be high. If the benefit count is x, then only the instances which improve at least x timing paths are swapped. Once no more instances can be swapped, we reduce the value of x and iterate again. The value of x can be reduced gradually to the smallest value of 1. Iterative swapping is also possible with benefit amount instead of benefit count.

Avoiding Swap of Gates on Side Paths

Figure 5:
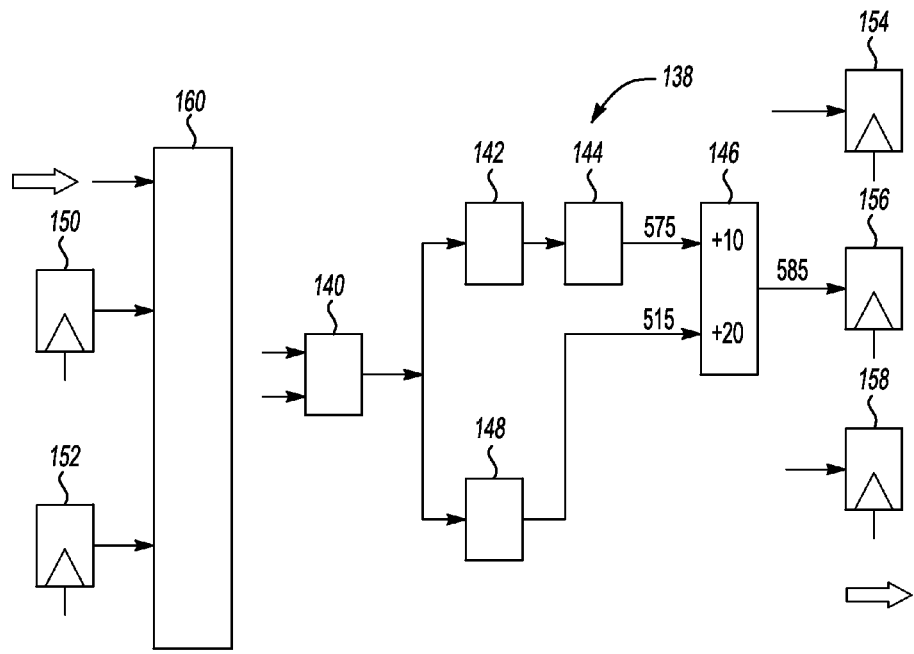
FIG. 5 is a block diagram of another portion of an integrated circuit.

FIG. 5 illustrates a situation where swapping an instance in a sub-critical (or side) path will not result in any benefit in terms of improving a timing path. A portion of an integrated circuit 138 includes gates 140-148, latches 150-158 and a collection of logic gates 160. Arrival times are listed for some of the gates. A side (sub) path is a partial path including one or more gates that branch from a more critical path and then merge with the original path (or another path more critical then the sub path) down stream. Swapping gates on certain sub paths will not benefit timing. The gate 148 lies on a side (sub) path. A simple way to detect a gate on a side path is to notice that the benefit count for the gate is zero along with the fact that no end node can be directly reached. Any reduction in arrival time from swapping the gate 140 will be propagated to both the upper and lower inputs to the gate 146. Hence, the upper input will continue to govern as the arrival time associated with it is latest.

Once many instances are swapped on a critical path, however, the side path may become the most critical such that the benefit count for the gate will no longer be zero. Incremental update of slack values for the gates in the priority list may bring a gate on a side path to the top of the list. At that point, the gate will be considered to be a candidate for swap. Whether the gate will be swapped to a lower power alternative or not depends on the benefit count (amount).

In detecting an instance on a side path, we can also consider an uncertainty factor to account for statistical variation due to process or other parameters. A $U_{th}$ value, for example, may be provided by the user, which may also be computed using statistical means such as a statistical static timer. The uncertainty factor may also account for variation between rise and fall times at nodes.

Avoidance of Over-Optimization

Figure 6A:
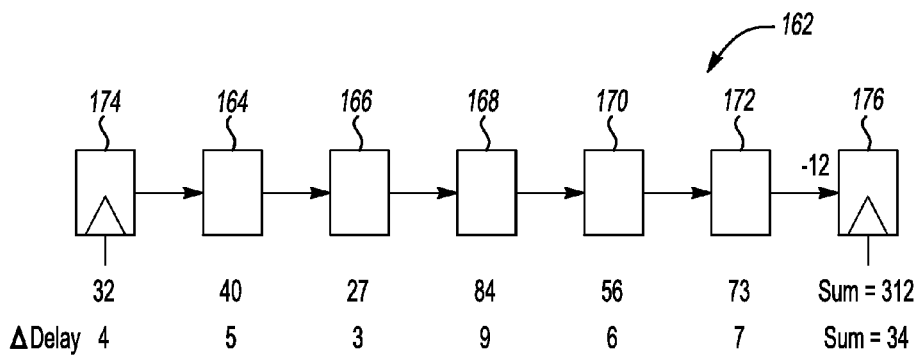
FIGS. 6A through 6C are block diagrams of yet another portion of an integrated circuit.
Figure 6B:
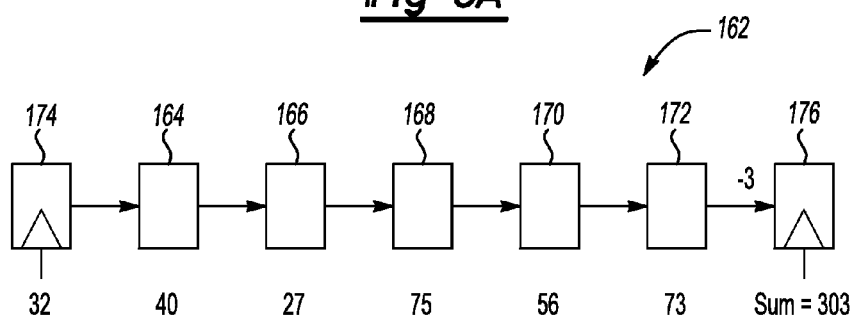
Figure 6C:
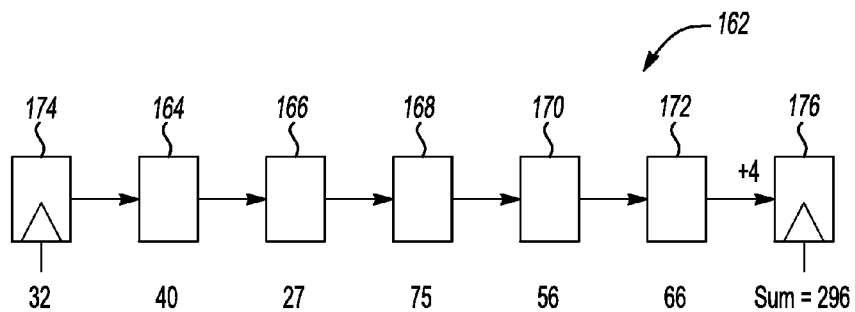

In case the slack violation in a timing path is not too much, it is possible to mitigate the violation by swapping only a fraction of the gates on the path. FIGS. 6A through 6C illustrate how the benefit count may be used to avoid over-optimization.

FIG. 6A shows such an example where slack violation is only 12 units. A timing path 162 includes gates 164-172 and latches 174, 176. Swapping the gates 164-172 and the latch 174 will benefit the path 162 by 34 units (much more than needed). The concept of benefit count helps to avoid this over-optimization by allowing us to swap only a fraction of the gates.

FIG. 6B shows the selection of the gate 168 with the highest priority value for swap. The benefit count for the gate 168 will be more than zero and the resultant slack will be negative three units due to the delay improvement of nine units from swapping.

FIG. 6C shows the selection of the next candidate gate 172 for swap. The delay reduction is seven units, resulting in a new slack of +4 (essentially removing all slack violation). Any subsequent attempt to swap a gate will result in zero benefit count and thus, we avoid swapping any further gates.

We also could have selected the gate 166 instead of the gate 172 to swap. The delta_delay for the gate 166 is just enough to bring the path slack from negative three to zero. Additional power savings will result if the delta_power for the gate 166 is less than the delta_power for the gate 172. We may accomplish this power savings by employing a look-ahead method in the priority list instead of strictly following the order in the priority list.

Consideration of the Fan-In Cone

We propagate delay improvements down stream following the fan-out logic cone. In certain circumstances, we do not need to update the timing in the fan-in cone. If the gate being swapped has the same input capacitance for various power alternatives, then the arrival times in the fan-in gates will not change if the gate is swapped. In other circumstances, the input capacitance may not be the same for gates across power alternatives. An increase in input capacitance will degrade the timing at the net connected to the input. A reduction in input capacitance will improve the delay. Under such conditions, we can compute the delay improvements and delay degradations at all impacted nodes by starting from the net connected to the input. During propagation, some nodes may see a benefit in slack and some nodes may see a degradation in slack. In addition, the benefit count (or amount) and the degradation count (or amount) may need to be combined to compute an overall benefit count (or amount). Swap decisions may be based on this overall benefit count (or amount).

Another issue concerns the slack values for the gates in the fan-in cone. Since the slack values are updated for the gates in the fan-out cone only, the slack values for gates in the fan-in cone may not be valid (a slack is defined for a timing path which may pass via a gate in the fan-in cone). This situation can be remedied by including level information in the priority metric of a gate. If a gate C2 is in the fan-out cone of a different gate C1, then the level of C2 is higher than the level of C1. We may partition the gates according to their levels and start the process of swapping from the lower levels.

In this scheme, gates in the first x levels are grouped together (a level group) and sorted according to the priority metric(s). Delta delays are propagated by x+y levels (y>2x being some predetermined positive number). The delta_delays for the first x-level group are propagated beyond the $2^{nd}$ x-level group to be considered. Thus, when propagating the delta_delays due to the $2^{nd}$ x-level group, we can combine the new benefits to be propagated with the benefit resulting from the first x-level group and propagate the combined benefit. The process continues until all level groups are considered. The last level group may have less than x-level logic gates.

Gates in a level group may have varied slack values, some having worse slack values which should be swapped first. To use the power budget efficiently, better slack gates at lower levels should not be processed before the worse slack gates at a higher level. Thus, we further partition gates in a level group according to the slack values, processing first the worse slack gates in all levels in the order of lower levels to higher levels. Better slack gates are processed subsequently in the order of lower levels to higher levels. The process of swapping stops whenever the power budget is exhausted.

This levelling concept helps with run time complexity. Propagating delay improvements all the way to the end points may be run time extensive. In this scheme, we ascertain the benefit count (or the benefit amount) at the nodes reached at the end of the propagation (not the ultimate end-nodes in the circuit). The maximum levels (y) to propagate provides a way to trade off between the quality (power reduction) and the run time.

Incremental Update of the Priority List

As we propagate the delta_delays, the slack values for the impacted gates change by the benefit amount (if the gate is swapped). We may find the impacted gates in the priority list, recompute their new priority value (due to change in slack value) and re-insert the gates according to the new priority values.

The algorithms disclosed herein may be deliverable to a processing device, such as the processing device 8, which may include any existing electronic control unit or dedicated electronic control unit, in many forms including, but not limited to, information permanently stored on non-writable storage media such as ROM devices and information alterably stored on writeable storage media such as floppy disks, magnetic tapes, CDs, RAM devices, and other magnetic and optical media. The algorithms may also be implemented in a software executable object. Alternatively, the algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While embodiments of the invention have been illustrated and described, it is not intended that these embodiments illustrate and describe all possible forms of the invention. The words used in the specification are words of description rather than limitation, and it is understood that various changes may be made without departing from the spirit and scope of the invention.

What is claimed:

1. A system for selecting gates for an integrated circuit design comprising:
   at least one processing device configured to (I) identify gates of the integrated circuit design having a slack value less than a predefined slack threshold; and (II) for each of the identified gates, determine (i) a number of nodes of the integrated circuit design that experience a timing slack improvement if an identified gate is swapped with an alternative implementation having a reduced delay or (ii) a sum of timing slack improvements experienced by nodes of the integrated circuit design if an identified gate is swapped with the alternative implementation having a reduced delay, and (III) swap the gate with the alternative implementation having the reduced delay if the determined number or sum is greater than a corresponding predetermined threshold.

2. The system of claim 1, wherein the at least one processing device is further configured to order the identified gates into a ranked list according to a priority metric and to sequentially perform operations of determining and swapping for each of the identified gates according to the ranked list until a power budget is exhausted or there are no more identified gates on the ranked list.

3. The system of claim 2, wherein the at least one processing device is further configured to, each time an identified gate is swapped, update slack values of nodes impacted by the swap.

4. The system of claim 3, wherein the at least one processing device is further configured to, each time an identified gate is swapped, update the priority metrics associated with nodes impacted by the swap and reorder the ranked list according to the updated priority metrics.

5. The system of claim 4, wherein the at least one processing device is further configured to determine whether there is any power budget remaining and to reduce the predetermined threshold if there is any power budget remaining.

6. The system of claim 2, wherein the priority metric includes at least one of gate power, change in the gate power, gate delay, change in the gate delay, change in interconnect delay, and gate slack.

7. The system of claim 2, wherein the priority metric includes gate level, level range or slack range.

8. The system of claim 1, wherein the nodes are end nodes or intermediate nodes.

9. A method of selecting gates for an integrated circuit design comprising:
   identifying, by at least one processing device, gates of the integrated circuit design having a slack value less than a predefined slack threshold; and
   for each of the identified gates,
      determining, by at least one processing device, a benefit count or benefit amount based on slack improvements associated with swapping the gate with an alternative implementation having a reduced delay, and
      swapping, by at least one processing device, the gate with the alternative implementation having the reduced delay if the benefit count or benefit amount is greater than a corresponding predetermined benefit threshold.

10. The method of claim 9, wherein the benefit count represents a number of nodes of the integrated circuit design that experience a timing slack improvement as a result of the gate being swapped with the alternative implementation.

11. The method of claim 10, wherein the nodes are end nodes or intermediate nodes.

12. The method of claim 9, wherein the benefit amount represents a sum of timing slack improvements experienced by nodes of the integrated circuit design as a result of the gate being swapped with the alternative implementation.

13. The method of claim 9, further comprising ordering the identified gates into a ranked list according to a priority metric, wherein the steps of determining and swapping are sequentially performed for each of the identified gates according to the ranked list until a power budget is exhausted or there are no more identified gates on the ranked list.

14. The method of claim 13, further comprising, each time an identified gate is swapped, updating slack values of nodes impacted by the swap.

15. The method of claim 14, further comprising, each time an identified gate is swapped, updating the priority metrics associated with nodes impacted by the swap and reordering the ranked list according to the updated priority metrics.

16. The method of claim 13, further comprising determining whether there is any power budget remaining and reducing the predetermined benefit threshold if there is any power budget remaining.

17. The method of claim 13, wherein the priority metric includes at least one of gate power, change in the gate power, gate delay, change in the gate delay, change in interconnect delay, and gate slack.

18. The method of claim 13, wherein the priority metric includes gate level, level range or slack range.

19. A computer readable medium comprising instructions stored thereon for directing one or more computers to
   identify gates of an integrated circuit design having a slack value less than a predefined slack threshold; and
   for each of the identified gates,
      determine a benefit count or benefit amount based on slack improvements associated with swapping the gate with an alternative implementation having a reduced delay, and
      swap the gate with the alternative implementation having the reduced delay if the benefit count or benefit amount is greater than a corresponding predetermined benefit threshold.

20. The computer readable medium of claim 19, wherein the instructions stored thereon further direct the one or more computers to order the identified gates into a ranked list according to a priority metric and to sequentially perform the operations of determining and swapping for each of the identified gates according to the ranked list until a power budget is exhausted or there are no more identified gates on the ranked list.

* * * * *